No. 749,855. PATENTED JAN. 19, 1904.
F. A. FELDKAMP.
PROCESS OF PRODUCING ELECTRODES FOR STORAGE BATTERIES
AND ELECTRODE.
APPLICATION FILED MAY 19, 1903.
NO MODEL.
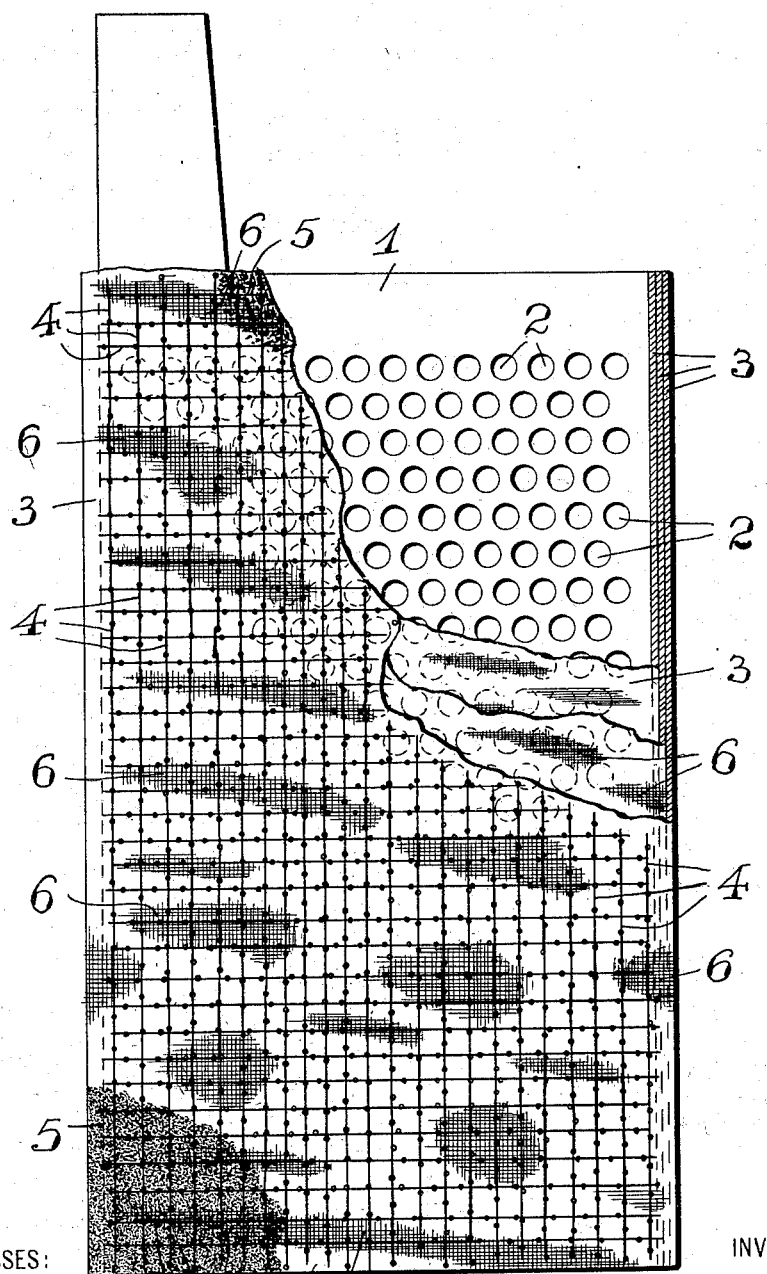
WITNESSES: Geo. D. Richards, F. H. W. Framtzel.
INVENTOR: Frederick A. Feldkamp,
BY Fred C. Fraentzel,
ATTORNEY No. 749,855.

Patented January 19, 1904.

UNITED STATES PATENT OFFICE.

FREDERICK A. FELDKAMP, OF NEWARK, NEW JERSEY, ASSIGNOR TO ELECTRA MANUFACTURING COMPANY, A CORPORATION OF NEW JERSEY.

PROCESS OF PRODUCING ELECTRODES FOR STORAGE BATTERIES AND ELECTRODE.

SPECIFICATION forming part of Letters Patent No. 749,855, dated January 19, 1904.

Application filed May 19, 1903. Serial No. 157,853. (No specimens.)

*To all whom it may concern:*

Be it known that I, FREDERICK A. FELDKAMP, a citizen of the United States, residing at Newark, in the county of Essex and State of New Jersey, have invented certain new and useful Improvements in Processes for Producing Electrodes for Storage Batteries and Electrodes Therefor; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention has reference to a novel process for producing electrodes or elements for storage batteries; and the invention relates also to a new construction of battery-electrode.

The principal object of this invention is to provide a novel process or method of producing a storage-battery electrode, which consists, essentially, in wrapping or incasing a perforated metal plate or grid in a layer or layers of an open-mesh fabric—such as mull, linen, mosquito-netting, or other suitable fabric—then securing the said fabric to the metal plate or grid, preferably by sewing, so as to provide pockets on opposite sides of the plate or grid, and applying an active material in a plastic or semiplastic state first upon the outer surface of the layer of fabric and by applying pressure forcing the active material into and through the interstices of the respective layers on the one side of the perforated plate or grid and through the openings or perforations in the plate or grid into and through the interstices of the layer or layers of fabric upon the opposite side of the plate or grid.

This invention has for its further object to provide in addition to the steps of the process above enumerated another step, which consists in applying the active material in a plastic or semiplastic state also upon the outer surface of the layer of fabric arranged upon the opposite side of the perforated metal plate or grid from that previously treated in the manner above stated and by applying pressure forcing the active material into and through the interstices of the respective layer or layers of fabric and causing the active material to be incorporated with the previously-inserted active material in the holes or perforations of the plate or grid to form a solid and integral mass and a lock at these points, which prevents displacement of the active material, as well as the fabric which has in this manner been incorporated in the active material.

The invention therefore consists in the novel process of producing electrodes for storage batteries, as will be hereinafter more particularly described; and this invention consists, furthermore, in the construction of battery-electrode made by my novel process, all with a view of providing the perforated metal plate or grid with an envelop or shield of open-mesh fabric having its interstices thoroughly embedded in an active material from the outer surface of the outer layer of fabric through the intermediate layers of fabric between said outer layer of fabric and the surface of the perforated metal plate or grid in a direction toward the plate or grid, the perforations or openings of which are also filled with the active material, whereby a strong and serviceable electrode for storage batteries is the result, the active material being held in place against displacement by disintegration, peeling, or shedding by the threads of the fabric which are thoroughly incorporated in the mass of active material, and thereby practically form an integral portion of the same.

One form of battery-electrode embodying the principles of the present invention is illustrated in the accompanying drawing, in which the reference character 1 indicates a metal plate or grid, usually of lead, that in the present case being provided with suitably-disposed holes or perforations 2. This plate or grid is wrapped in an open-mesh fabric 3, which may be such material as mull, linen, mosquito-netting, or other suitable fabric, the same being wrapped around the metal plate or grid to provide the said plate or grid upon its opposite sides preferably with three layers of fabric upon each side of the plate or grid. It will, however, be understood that I do not limit myself to the number of wrappings, and the same may be increased or decreased, according to the thickness of the electrode desired and according to the kind and quality of fabric employed. One form of open-mesh fabric which is admirably adapted for the purposes of my invention is mosquito-netting having preferably from eight to ten threads each way per square inch.

Having wrapped the plate or grid 1 with the fabric, the latter is preferably secured in place by stitching it fast to the plate by means of stitches 4 in an ordinary sewing-machine with the usual thread and needle, whereby the layers of fabric and the metal plate 1 will provide on opposite sides of the plate numerous small pockets, all of which will be clearly evident from an inspection of the drawing. The fabric itself, as well as the thread employed, is preferably treated to produce nitrocellulose or pyroxylin, so as to retain its strength in the electrolyte of the battery when under electric action, the same being preferably treated after having been sewed fast to the plate or grid by dipping the plate and its attached fabric in the usual solutions practical for this purpose and then dried. Having thus enveloped the plate or grid 1 with the fabric layer or layers, when held up toward the light it will have the appearance of a finely-meshed sieve, the light clearly striking through the fabric and the holes or perforations in the metal plate or grid 1.

The active material, partially shown in the lower left-hand corner of the electrode indicated in the drawing, is represented by the reference character 5, the meshes or threads of the fabric being indicated by the reference character 6.

The active material 5 in its initial state is in a plastic or semiplastic condition and is applied by means of a trowel or any other suitable manner first to the outer surface of the outer fabric layer, and then by means of pressure it is forced from said outer surface into and through the open mesh of the layer or layers of fabric against the one side of the metal plate or grid and also directly into and through the openings in said plate or grid, whereby the said openings are fully closed up with active material and, for that matter, with portions of the threads or strands of the fabric. The pressure applied is such that the active material is forced entirely through the openings in the plate or grid and incorporated in the open-meshed fabric layer or layers upon the opposite side of the said plate or grid. Having in this manner prepared the one side of the electrode, active material in a plastic or semiplastic state is now applied to the outer surface of the outer fabric layer upon said opposite side of the metal plate-grid and then under pressure is forced through the interstices of the said layer or layers, whereby any portions of fabric which have not been previously filled with the active material, as well as the unperforated portions of said opposite side of the plate or grid, are brought in close and intimate contact with such active material.

When the active material has set and becomes hard, the layer or layers of inert fabric, the perforated metal plate or grid, and the active material all produce one integral mass or electrode of extreme hardness, there being no independent and separable strata of active material and layer or layers of fabric; but the whole forms one conglomeration or mass of active material and threads, which also extends into and through the openings in the plate or grid. The threads of the fabric thus act to retain or hold the particles of active material together in a similar manner to the hair used by the plasterer in plaster or mortar, and the active material and threads being also located in the openings of the metal plate or grid and integrally united with the active material and fabric or threads upon the opposite side of the plate or grid a perfect lock is produced, and the active material is positively prevented from peeling, blistering, creeping, or from becoming dislodged from the opposite sides of the metal plate or grid, which is thus embedded in a hard and tough cementitious mass of active material and threads of fabric.

Having thus described my invention, what I claim is—

1. A process of producing an electrode for storage batteries which consists in inclosing a perforated metal plate or grid in an open-mesh fabric, and securing said fabric on opposite sides of the plate or grid, and forcing an active material in a plastic or semiplastic state from the outer surface of the fabric on the one side of the plate or grid into and through the interstices of said fabric and directly upon the surface of the plate or grid and into and through the perforations in said plate or grid and into and through the fabric upon the opposite side of said plate or grid, and drying the active material to produce a hard mass of active material in which the threads of the fabric are incorporated, substantially as set forth.

2. A process of producing an electrode for storage batteries which consists in inclosing a perforated metal plate or grid in an open-mesh fabric, and securing said facric on opposite sides of the plate or grid, and forcing an active material in a plastic or semiplastic state from the outer surface of the fabric on the one side of the plate or grid into and through the interstices of said fabric and directly upon the surface of the plate or grid and into and through the perforations in said plate or grid and into and through the fabric upon the opposite side of said plate or grid, then forcing an active material in a plastic or semiplastic state from the outer surface of the fabric upon the other side of the plate or grid and into and through the interstices of said fabric directly upon said other side of the plate or grid and into and through the perforations in the plate or grid, so as to become incorporated with the previously-inserted active material in said perforations, and then drying the active material to produce a hard mass of active material in which the threads of the fabric are incorporated, substantially as set forth.

3. A process of producing an electrode for storage batteries which consists in providing a metal plate or grid with openings, inclosing the said plate or grid in an open-mesh fabric, sewing the said fabric fast to the said plate or grid, and then forcing an active material through the meshes from the outer surfaces of the fabric directly upon the surfaces of the plate or grid and into and through the openings in said plate or grid, substantially as set forth.

4. A process of producing an electrode for storage batteries which consists in providing a metal plate or grid with a series of three layers of an open-mesh fabric on each side of the plate or grid, sewing the said layers of fabric fast to the said perforated plate or grid, and then forcing an active material through the meshes from the outer surfaces of the fabric directly upon the surfaces of the plate or grid and into and through the openings in said plate or grid, substantially as set forth.

5. A battery-electrode comprising a perforated metal plate or grid, an open-mesh fabric attached to said plate or grid, and an active material extending through the interstices of said fabric from its outer surface in an inward direction toward and directly upon the unperforated surface portion of the plate or grid and into the perforations in said plate or grid, substantially as and for the purposes set forth.

6. A battery-electrode comprising a perforated metal plate or grid, an open-mesh fabric attached to the said plate or grid on opposite sides of said plate or grid, active material extending through the interstices of the fabric on the one side of the plate or grid from the outer surface of the fabric in an inward direction toward and directly upon the unperforated surface portions of the plate or grid and through the perforations in said plate or grid and through the interstices of the fabric upon the other side of said plate or grid, and an active material extending through the interstices of said fabric on said other side of the plate or grid in an inward direction toward and directly upon the unperforated surface portions of the plate or grid and into the perforations in said plate or grid, so as to be incorporated in said perforations with the previously-inserted active material, substantially as and for the purposes set forth.

7. A battery-electrode comprising a perforated metal plate or grid, an open-mesh fabric on said plate or grid, stitching for securing said fabric in place, and an active material extending through the interstices of said fabric from its outer surface in an inward direction toward and directly upon the unperforated surface portion of the plate or grid and into the perforations in said plate or grid, substantially as and for the purposes set forth.

8. A battery-electrode comprising a perforated metal plate or grid, an open-mesh fabric on opposite sides of said plate or grid, stitching for securing said fabric in place, active material extending through the interstices of the fabric on the one side of the plate or grid from the outer surface of the fabric in an inward direction toward and directly upon the unperforated surface portions of the plate or grid and through the perforations in said plate or grid and through the interstices of the fabric upon the other side of said plate or grid, and an active material extending through the interstices of said fabric on said other side of the plate or grid in an inward direction toward and directly upon the unperforated surface portions of the plate or grid and into the perforations in said plate or grid, so as to be incorporated in said perforations with the previously-inserted active material, substantially as and for the purposes set forth.

9. A battery-electrode comprising a metal plate having perforations, an open-mesh fabric attached to the said plate or grid on opposite sides of said plate, active material incorporated in the interstices of the fabric from the outer surfaces of the fabric toward the plate, said active material being arranged in the perforations in the said plate from the opposite sides of the plate, and when set forming a lock, substantially as and for the purposes set forth.

10. A battery-electrode comprising a metal plate having perforations, an open-mesh fabric of from eight to ten threads per square inch, arranged on opposite sides of and attached directly to said plate, active material incorporated in the interstices of the said fabric from the outer surfaces of the fabric toward the plate, said active material being arranged in the perforations in the said plate from the opposite sides of the plate, and when set forming a lock, substantially as and for the purposes set forth.

11. A battery-electrode, comprising, a metal plate, an open-mesh fabric of interwoven threads on said plate, and an active material incorporated and hardened in the interstices formed by said threads, said threads extending from the outer surface of the mass of hardened active material throughout the body of said active material and upon the surface of the metal plate, substantially as and for the purposes set forth.

12. A battery-electrode, comprising, a metal plate provided with perforations, an open-mesh fabric of interwoven threads on the opposite sides of said plate, and an active material incorporated and hardened in the interstices formed by said threads and also in the perforations in said plate, said threads extending from the outer surfaces of the mass of hardened active material throughout the body of said active material, and upon the opposite sides of the metal plate, and said threads extending also into the perforations in said plate, substantially as and for the purposes set forth.

In testimony that I claim the invention set forth above I have hereunto set my hand this 16th day of May, 1903.

FREDERICK A. FELDKAMP.

Witnesses:
    FREDK. C. FRAENTZEL,
    GEO. D. RICHARDS.